United States Patent [19]

de Vries

[11] Patent Number: 5,812,992
[45] Date of Patent: Sep. 22, 1998

[54] METHOD AND SYSTEM FOR TRAINING A NEURAL NETWORK WITH ADAPTIVE WEIGHT UPDATING AND ADAPTIVE PRUNING IN PRINCIPAL COMPONENT SPACE

[75] Inventor: Aalbert de Vries, Lawrence Township, Mercer County, N.J.

[73] Assignee: David Sarnoff Research Center Inc., Princeton, N.J.

[21] Appl. No.: 848,202

[22] Filed: Apr. 29, 1997

Related U.S. Application Data

[63] Continuation of Ser. No. 448,770, May 24, 1995, abandoned.

[51] Int. Cl.[6] .................................................. G06F 15/18
[52] U.S. Cl. .............................. 706/25; 706/15; 706/16; 706/21
[58] Field of Search .............................. 395/21, 22, 23, 395/24; 706/15, 16, 25, 26, 21

[56] References Cited

U.S. PATENT DOCUMENTS

| | | | |
|---|---|---|---|
| 5,052,043 | 9/1991 | Gaborski | 382/157 |
| 5,129,039 | 7/1992 | Hiraiwa | 395/24 |
| 5,140,670 | 8/1992 | Chua et al. | 395/24 |
| 5,159,660 | 10/1992 | Lu et al. | 395/22 |
| 5,168,262 | 12/1992 | Okayama | 340/523 |
| 5,175,678 | 12/1992 | Frerichs et al. | 364/148 |
| 5,253,329 | 10/1993 | Villarreal et al. | 395/23 |
| 5,268,834 | 12/1993 | Sanner et al. | 364/151 |
| 5,280,564 | 1/1994 | Shiomi et al. | 395/23 |
| 5,282,261 | 1/1994 | Skeirik | 395/22 |
| 5,371,834 | 12/1994 | Tawel | 395/23 |
| 5,636,326 | 6/1997 | Stork et al. | 395/21 |

OTHER PUBLICATIONS

Chen H. and Liu R., An On–Line Unsupervised Learning Machine for Adaptive Feature Extraction, IEEE trans. on Circuits and Systems II, vol. 41, No. 2, pp. 87–98, (1994).

De Vries B., Gradient–Based Adaptation of Network Structure, International Conference on Artificial Neural Networks 94, Sorrento, Italy, (May 1994).

King S.Y., and Diamantaras K., A neural Network Learning algorithm for Adaptive Principal Component Extraction (APEX), Proc. of IEEE Int'l Conf. on Acoustics, Speech and Signal Processing (ICASSP), pp. 861–864, (1990).

Levin, A., and Leen T., and Moody J., Fast Pruning Using Principal Components, Advances in Neural Information Processing Systems (NIPS) 6, pp. 35–42, Morgan Kaufmann Publishers, (1994).

Levin et al., "Fast Pruning Using Principal Components," Advances in Neural Information Processing Systems (NIPS) 6, pp. 35–42, 1994.

Kung, S.Y. and Diamantaras, K., "A Neural Network Learning Algorithm for Adaptive Principal Component Extraction (APEX)", Proc. of IEEE Int'l Conf. on Acoustics, Speech and Signal Processing (ICASSP), pp. 861–864, 1990.

Levin, A., and Leen, T. and Moody, J., "Fast Pruning Using Principal Components", Advances in Neural Information Processing Systems (NIPS) 6, pp. 35–42, 1994.

*Primary Examiner*—Tariq R. Hafiz
*Assistant Examiner*—Jason W. Rhodes
*Attorney, Agent, or Firm*—William J. Burke

[57] ABSTRACT

A signal processing system and method for accomplishing signal processing using a neural network that incorporates adaptive weight updating and adaptive pruning for tracking non-stationary signal is presented. The method updates the structural parameters of the neural network in principal component space (eigenspace) for every new available input sample. The non-stationary signal is recursively transformed into a matrix of eigenvectors with a corresponding matrix of eigenvalues. The method applies principal component pruning consisting of deleting the eigenmodes corresponding to the smallest saliencies, where a sum of the smallest saliencies is less than a predefined threshold level. Removing eigenmodes with low saliencies reduces the effective number of parameters and generally improves generalization. The output is then computed by using the remaining eigenmodes and the weights of the neural network are updated using adaptive filtering techniques.

21 Claims, 5 Drawing Sheets

METHOD AND SYSTEM FOR TRAINING A NEURAL NETWORK WITH ADAPTIVE WEIGHT UPDATING AND ADAPTIVE PRUNING IN PRINCIPAL COMPONENT SPACE

CROSS REFERENCE TO RELATED APPLICATION

This application is a continuation of patent application Ser. No. 08/448,770 entitled "METHOD AND SYSTEM FOR TRAINING A NEURAL NETWORK WITH ADAPTIVE WEIGHT UPDATING AND ADAPTIVE PRUNING IN PRINCIPAL COMPONENT SPACE" filed on May 24, 1995, now abandoned.

The present invention relates generally to the field of neural information processing and, more particularly, to a signal processing system and method for accomplishing signal processing with a neural network that incorporates adaptive weight updating and adaptive pruning for tracking non-stationary signals.

BACKGROUND OF THE INVENTION

Over the years, neural network modeling has been developed to solve problems ranging from natural language understanding to visual processing. A neural network is a computational model composed of neurons (or simply nodes) and connections between the nodes. The strength of each connection is expressed by a numerical value called a weight, which can be modified. Similarly, the "firing" of each node is associated with a threshold numerical value, which is referred to as the nodes' activation. The activation of a given node is based on the activations of the nodes that have connections directed at that node and the weights on those connections. In general, a neural network incorporates some special nodes called input nodes with their activation externally set, while other nodes are distinguished as output nodes.

In contrast to conventional computers, which are programmed to perform specific tasks, most neural networks can be taught, or trained. As such, a rule that updates the activations is typically referred to as the update rule. Similarly, learning in a neural network is generally accomplished using a learning rule to adjust the weights.

A typical neural network model has a set of input patterns and a set of output patterns. The role of the neural network is to perform a function that associates each input pattern with an output pattern. A learning process, such as "error back-propagation", uses the statistical properties of a training set of input/output patterns to generalize outputs from new inputs.

Error back-propagation is a supervised learning process through which a neural network learns optimal weights. Error back-propagation compares the responses of the output nodes to a desired response, and adjusts the weights in the network so that if the same input is presented to the network again, the network's response will be closer to the desired response.

Referring to FIG. 1, the learning rule of error back-propagation is applied to a multi-layer neural network having an input layer 130, an intermediate layer or so-called hidden layer 140 and an output layer 150. The output values of all nodes $n_h$ 112 in the input layer 130 are distributed as an input value to each of the node $n_i$ 114 in the intermediate layer 140. The output value of each of the nodes in the intermediate layer 140 is distributed as an input value to every node $n_j$ 116 in the output layer 150. Each node $n_j$ 116 produces a value which is the total sum net of output values $O_i$ of a node $n_i$ coupled to the output node $n_j$ by a coupling weight $w_{ji}$, transformed by a predetermined function f. This same concept applies to the intermediate node $n_i$ 114 with respect to input node $n_h$ 112. In other words, when the values within a pattern p are provided as an input value to each node $n_h$ 112, an output value $O_{pi}$ and $O_{pj}$ for each node $n_i$ 114 and $n_j$ 116 respectively, can be expressed by the following formulas:

$$O_{pi} = f_i\left(\sum_h w_{ih} \cdot O_{ph}\right) \quad (1)$$

$$O_{pj} = f_j\left(\sum_i w_{ji} \cdot O_{pi}\right)$$

Hence, the network acquires output value $O_{pj}$ of the output node $n_j$ 116 of the output layer 150 by sequentially computing the output values of the input $n_j$ 116, each corresponding to a node from the input layer 130 towards the output layer 150.

The process of learning in accordance with error back-propagation consists of updating coupling weights $w_{ji}$ and $w_{ih}$, so that the total sum $E_p$ of the square errors between the output value $O_{pj}$ of each node of the output layer 150 on applying the input pattern p and the desired output $t_{pj}$, is minimized. Hence, the total network error E for the input pattern p is defined by:

$$E_p = \frac{1}{2} \sum_j (t_{pj} - O_{pj})^2 \quad (2)$$

This algorithm is sequentially applied from the output layer 150 back toward the input layer 130. The network error with respect to any weight, e.g. weight $w_{ji}$, is given by the gradient $\partial E_p/\partial w_{ji}$ of the total network error $E_p$ with respect to a change in that weight. Hence, the error $\delta_j$, for each output node $n_j$ 116 can be determined as a function of the corresponding actual value $O_{pj}$ and target value $t_{pj}$ and the difference therebetween for that node, as follows:

$$\delta_j = t_{pj}(1 - t_{pj})(O_{pj} - t_{pj}) \quad (3)$$

and for an intermediate node $n_i$ 114, as follows:

$$\delta_i = t_{pi}(1 - t_{pi})\sum_j (\delta_j w_{ji}) \text{ for all } j. \quad (4)$$

After the neural errors are determined, these errors are propagated, via leads 170, back toward the network input nodes.

The coupling weights of both the output layer 150 and the intermediate layer 140 are adjusted according to the following learning rules 180 for $n_j$ 116:

$$\Delta w_{ji}(n+1) = \eta \delta_j t_{pj} + \alpha \Delta w_{ji}(n) \quad (5)$$

and for each intermediate node $n_i$ 114:

$$\Delta w_{ih}(n+1) = \eta \delta_i t_{pi} \alpha \Delta w_{ih}(n) \quad (6)$$

In the above formulas, η represents the rate of learning, which is a constant, and it determines how fast the network weights converge during network training. Coefficient a represents a stabilization factor for reducing the error oscillations and accelerating the convergence thereof. Both coefficients η and α can be empirically determined from the number of nodes, layers, input values or output values. This weight adjustment process is repeated until the patterns in the training set are exhausted or when the final error value falls below a predefined upper bound $E_{max}$. For a detailed explanation of error back-propagation in neural networks, see S. Haykin, *Neural Networks,* IEEE Press, (1994).

However, error back-propagation is limited in that this technique does not provide any information concerning the optimal number of nodes in the neural network. For example, if the neural network has a predefined number of nodes, the error back-propagation will continue to update the weights for all nodes regardless of whether all the nodes are necessary to achieve the desired response. The effect to the output of having too many nodes will be "overfitting", which leads to poor performance on an out-of-sample data set. Conversely, if the number of nodes defining the network is too few, the neural network will not be optimal because the network will be missing vital information.

To address this network optimization issue, techniques have been developed to assess the need to add or remove a node from a neural network. However, these techniques are generally not well suited for signals whose statistical properties change over time. Such signals are known as "non-stationary signals". For example, if a node is added to a neural network, it will require several time steps to acquire the necessary information to train the weight for this new node. Since the statistical properties of non-stationary signals may change rapidly, the neural network may no longer be of optimal size by the time the new node is trained.

Real world signals such as financial, physiological and geographical data often are non-stationary. Because the number of parameters in a network is a crucial factor in it's ability to generalize, it is the goal of an appropriate model to track the non-stationary signals by adaptively (on-line) updating its parameters. Ideally, this means updating, in response to changes in the input signal, "structural parameters" such as the effective number of hidden nodes (intermediate layer nodes) within the network.

However, traditional methods generally do not provide this capability. For a non-stationary signal, it is not appropriate to fix the model parameters after training on a representative data set.

In addition, weight updates make use of the gradient ($\partial E/\partial w$) of the error E with respect to the weights. Generally, this gradient can be directly computed from the neural network by an error back-propagation process. However, such a gradient cannot be computed with respect to the number of nodes. Since these parameters are in the form of integers, it would not be possible to compute the gradient of the error with respect to parameters, which are required for gradient-based optimization methods.

Therefore, a need exists in the art for a system and method capable of adaptively updating the structural parameter of a neural network for every new available sample of data for tracking non-stationary signals.

SUMMARY OF THE INVENTION

The present invention overcomes the disadvantages associated with the prior art by providing a signal processing system and method that updates structural parameters of the neural network system. Specifically, the invention updates the structural parameters of the neural network in principal component space for every new available input sample. The method of the present invention referred generally as adaptive eigenpruning and adaptive weight updating, consists of six steps which are applied to each new available sample of the input signal. Since the present invention can be applied to any layer of a neural network, the term input signal may represent an input signal to an input layer of a neural network or an input signal to a hidden layer of a neural network.

The first step transforms a non-stationary signal (input signal) to principal component space where the non-stationary signal is transformed into a matrix of eigenvectors with a corresponding matrix of eigenvalues. In statistical literature, this first step is known as performing a principal component analysis (PCA) on the signal. This is a transformation that projects the input signal into a different space used to determine the resonance of the input signal.

However, performing a principal component transformation directly on every new signal input is computationally expensive, so that once a transformation is completed, the inventive method employs recursive estimation techniques for estimating eigenvectors and eigenvalues. The adaptive principal component extraction (APEX) or the LEArning machine for adaptive feature extraction via Principal component analysis (LEAP) are just two examples of such extraction techniques.

The second step transforms the non-stationary input signal (in general, a vector signal) to its principal component space (which is hereinafter referred to as "eigenspace"). The goal of this transformation is to make the components of the input signal mutually orthogonal. The advantage of such a representation is that the effects of the orthogonal components (the "eigenmodes") of the input signal on the filter or neural network output signal can be analyzed individually without taking the other eigenmodes into account.

In the third step, the method computes an "unpruned" output signal by multiplying the orthogonalized input signal with the filter or neural network weight matrix.

In the fourth step, the method selects components of the weighted input signal for pruning from the output signal. The selection procedure identifies the eigenmodes that are revealed in eigenspace to be of minimal influence on the output signal of the system. This step is derives an upperbound on the modeling error introduced by deleting the eigenmodes. This error upperbound is defined as the saliency for the ith eigenmode.

In the fifth step, the method completes the "eigenpruning" by subtracting eigenmodes with small saliencies from the output signal. Since eigenpruning and recomputing the error upperbounds are performed for each new input sample, this method is known as adaptive eigenpruning. Removing eigenmodes reduces the effective number of parameters and generally improves generalization, i.e., performance on an out-of-sample data set.

Finally, the sixth step applies standard filtering techniques such as the Transform Domain Adaptive Filtering (TDAF) to update the weights of the filter or neural network.

Specifically, the present invention applies the six steps mechanism to every input sample, thereby adaptively updating the weights and effective number of nodes in a neural network for every input sample of a non-stationary signal.

BRIEF DESCRIPTION OF THE DRAWINGS

The teachings of the present invention can be readily understood by considering the following detailed description in conjunction with the accompanying drawings, in which.

DETAILED DESCRIPTION

After considering the following description, those skilled in the art will realize that the teachings of this invention can be readily utilized to predict non-stationary signals (including, but not limited to financial signals). In general, this invention discloses a method and system for updating a layer in a neural network by adaptively updating the weights and effective number of nodes of the network. This is accomplished by applying the concept of adaptive eigenpruning to a neural network.

Figure 1:
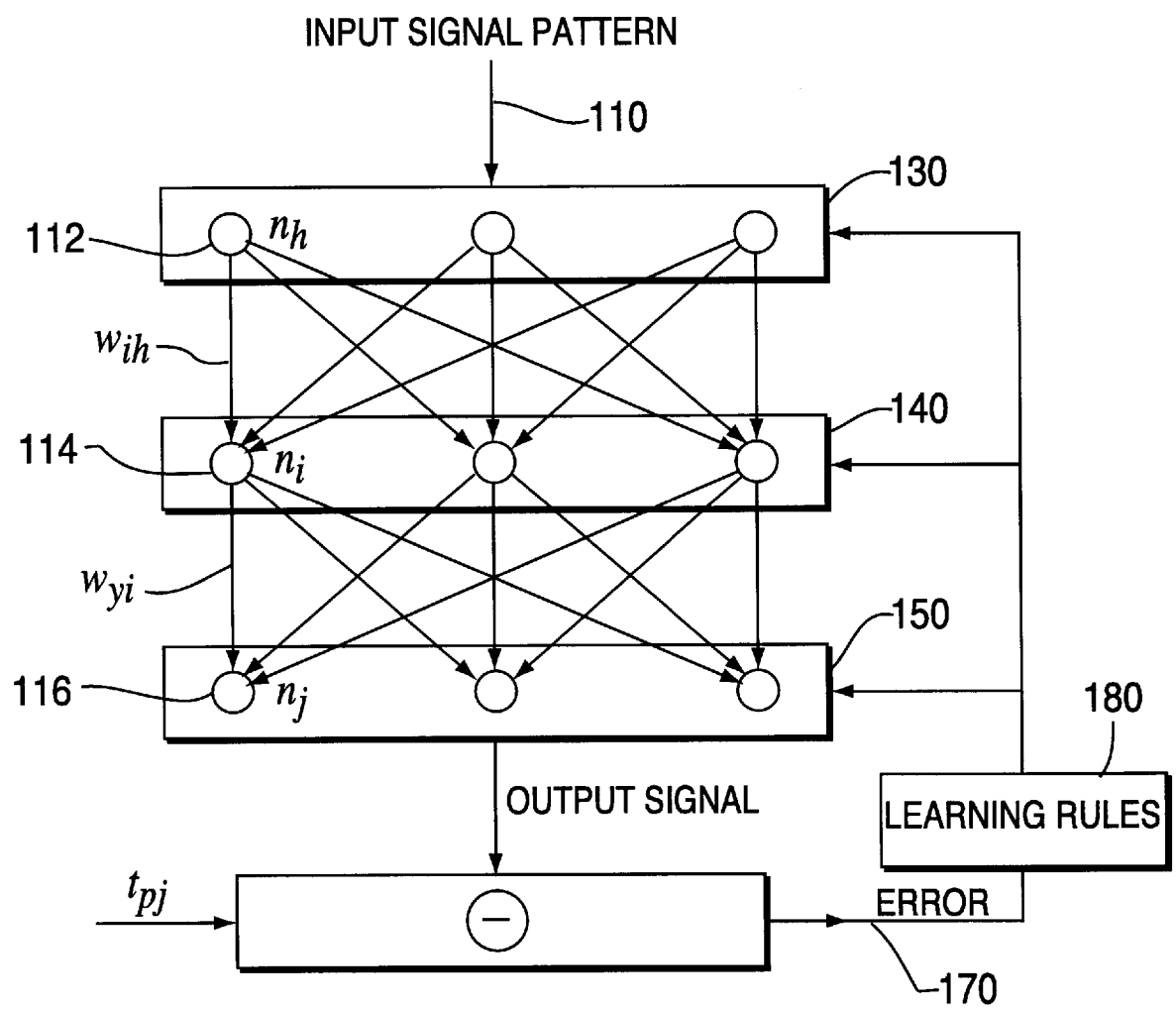
FIG. 1 is a block diagram of a neural network applying a prior art error back propagation process.
Figure 2:
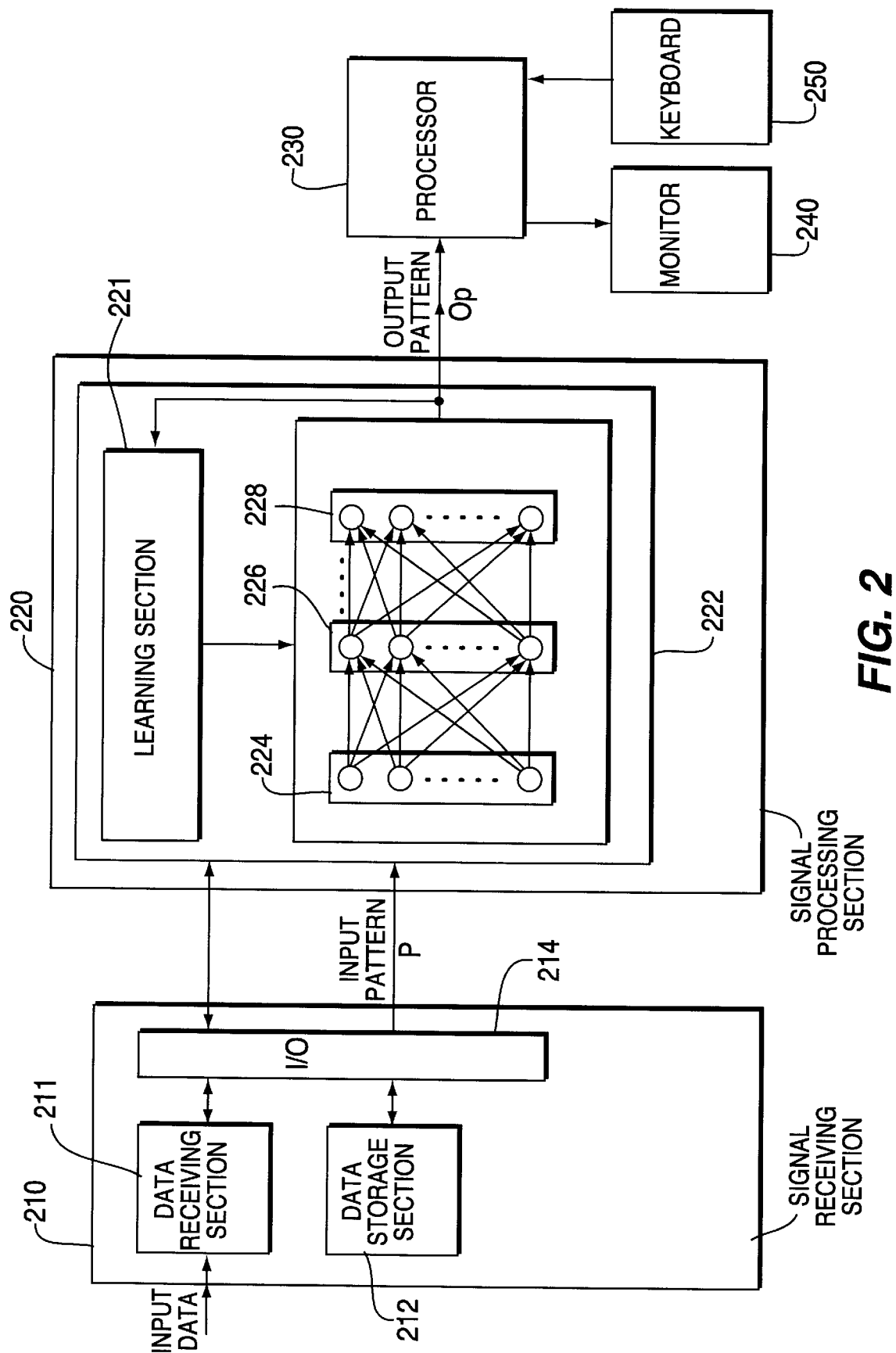
FIG. 2 is a block diagram of a signal processing system that contains a neural network that embodies the teachings of the present invention.

FIG. 2 depicts a signal processing system that utilizes the present inventions. This general signal processing system consists of a signal receiving section 210, a signal processing section 220, a processor 230, a monitor 240 and a keyboard 250.

Signal receiving section 210 serves to receive input data signals, such as financial data. Signal receiving section 210 consists of a data receiving section 211, a data storage section 212, and input/output (I/O) switch 214. Data receiving section 211 may include a number of devices such as a modem and an analog-to-digital converter. A modem is a well-known device that comprises a modulator and a demodulator for sending and receiving binary data over a telephone line, while an analog-to-digital converter converts analog signals into a digital form. Hence, input signals are received "on-line" through signal receiving section 210 and, if necessary, are converted to a digital form.

The data storage section 212 serves to store input signals received by data receiving section 211. Data storage section 212 may incorporate a number of devices such as a disk drive, semiconductor memory or other storage media. These storage devices provide a method for applying a delay to the input signals and store input signals for processing at a later time. Finally, the stored input signals are presented to the signal processing section 220 through input/output switch 214, which channels the input signal from signal receiving section 210 to signal processing section 220. The I/O switch 214 also channels the input signals between data receiving section 211 and data storage section 212.

The signal processing system of the present invention includes a signal processing section 220 for producing an output signal $O_p$ from input signal patterns p. The signal processing section 220 consists of a neural network 222 with a learning section 221. The neural network 222 includes at least an input layer 224 and an output layer 228. The neural network may optionally include a number of intermediate layers 226 (also known as hidden layers). Each layer includes at least one node.

A desired (target) output signal $t_p$ and the output signal $O_p$ are applied to learning section 221. Applying a learning signal as described below, learning section 221 causes neural network 222 to undergo learning by updating the parameters w in such a manner that each w is sequentially and repeatedly updated.

Figure 3:
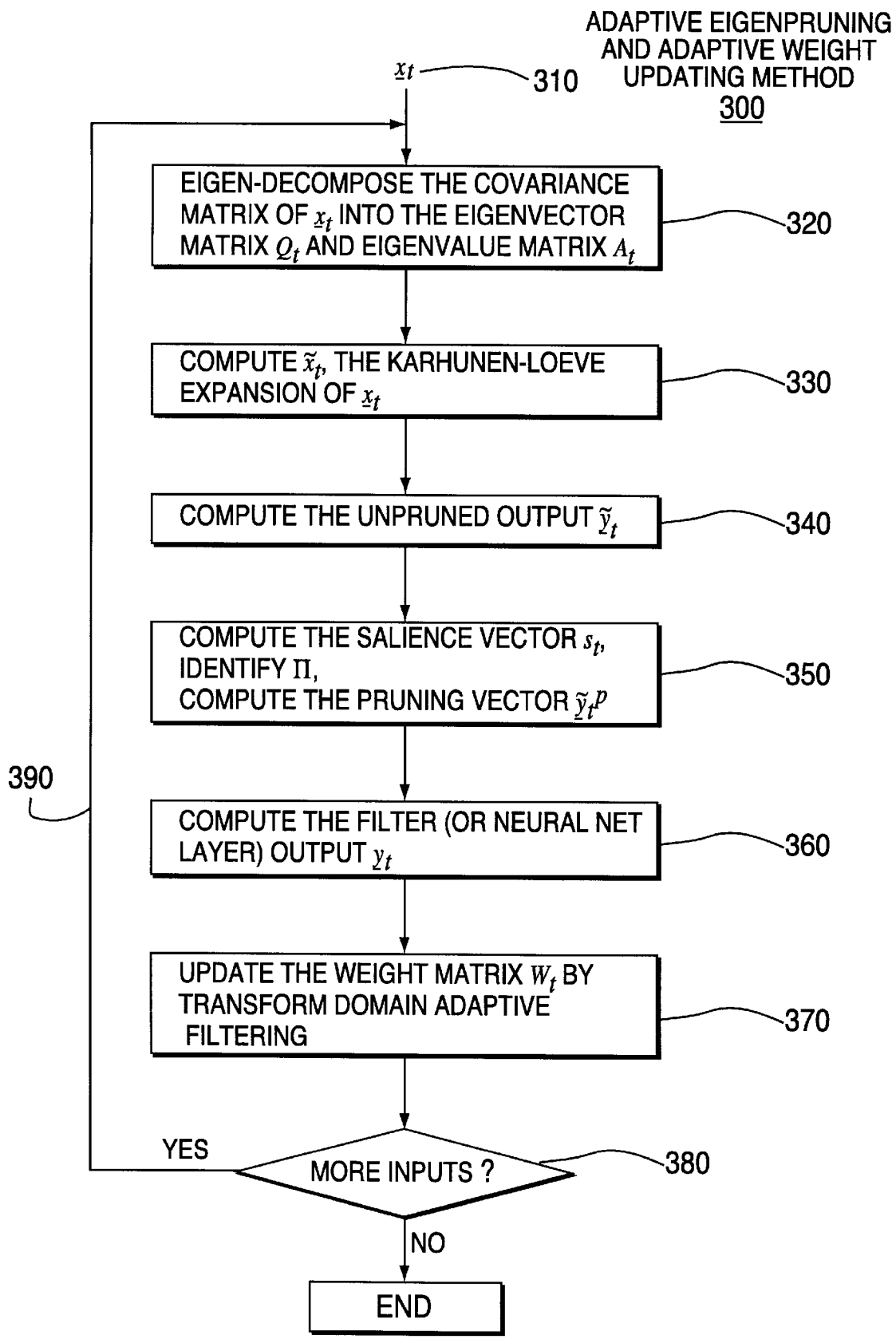
FIG. 3 is a flowchart showing the process of adaptive weight updating and adaptive eigenpruning.
Figure 6:
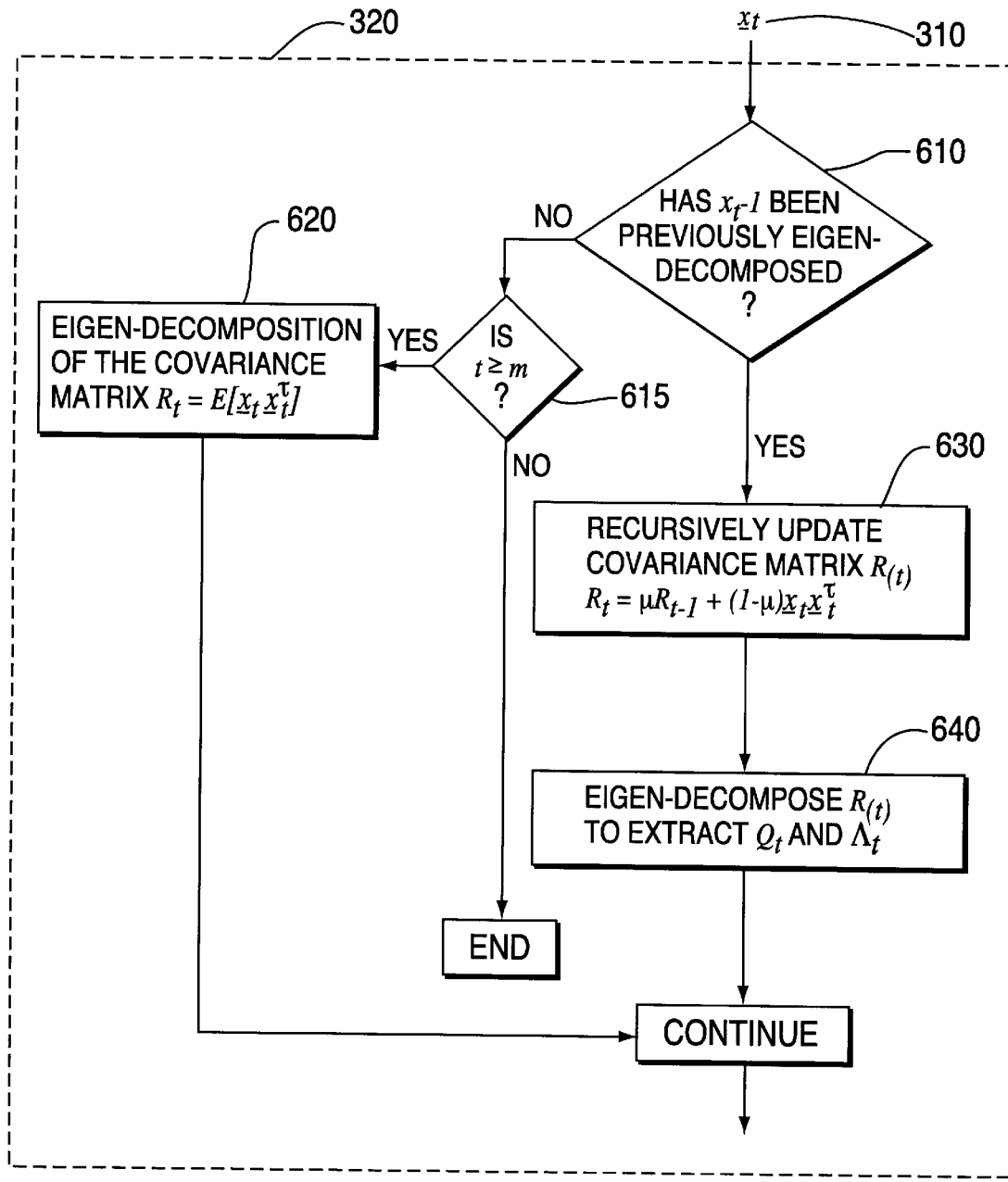
FIG. 6 is a block diagram for the mechanism of recursive estimation of the eigenvalue and eigenvector matrices.

The neural network 222 of signal processing section 220 computes, in accordance with the sequences of steps shown by the flow charts of FIG. 3 and 6, an output signal $O_p$ from an input pattern p. Output signal $O_p$ is an output value that correlates to a prediction of the value of input pattern p for n samples ahead.

The processor 230 of the signal processing system receives the output signal $O_p$ and performs additional data processing such as determining the direction or trend of the input pattern p. Furthermore, the processor 230 is coupled to a monitor 240 and a keyboard 250 for displaying data and receiving inputs respectively.

The method of adaptively updating the dimensions of a neural network for every new available input sample of data for tracking non-stationary signals are described with reference to method 300 of FIG. 3. Method 300 starts by taking an input vector $\underline{x}_t = [x_1(t), x_2(t), \ldots, x_n(t)]^T$ 310 and transforms it into principal component space in step 320. This step multiplies the vector of elements representing the input signal by a matrix so as to transform the coordinates in which the vector is represented to ones that display the maximum variance along their axes, thus removing correlations between pairs of coordinates.

To illustrate, the method assumes a signal plus noise model with the signal generated by a function linear in the weights which can be represented by $\underline{y}_t = W_0 \underline{x}_t + \underline{e}_t$. This, in turn, is modeled by:

$$\hat{\underline{y}}_t = W \underline{x}_t \tag{7}$$

Depending on the particular application, $\underline{x}_f$ may represent one of a number of different signals, including an input vector signal, an output signal from a layer in a neural network or a regression vector on $\underline{y}_t$ itself. It should be noted that throughout this specification, vectors are represented with an underscore, while matrices are represented by capitals.

However, the dimension of $\underline{x}_f$ may be time varying, which makes it difficult to estimate the dimension of $\underline{x}_t$. Hence, choosing a fixed dimensional choice is inappropriate. The covariance matrix of input $\underline{x}_t$ is defined as $R_t = E[\underline{x}_t \underline{x}_t^T]$, which can be estimated by:

$$R_t = \Sigma_{n=0}^{t} \mu^{t-n} \underline{x}_n \underline{x}_n^T \tag{8}$$

Mu ($\mu$) is defined as a forgetting (decaying) factor which causes exponential decay of the temporal weighing of $\underline{x}_t$ in $R_t$. Where the vector signals are non-stationary, $\mu$ is less than 1. Specifically, the forgetting factor $\mu$ is commonly chosen in the interval $0.950 < \mu < 0.999$.

The eigen-decomposition of $R_t$, also called principal component extraction of $\underline{x}_t$, can be defined by:

$$R_t Q_t = Q_t \Lambda_t \tag{9}$$

where $Q_t = [\underline{q}_1, \underline{q}_2, \ldots, \underline{q}_n]$ is the n×n orthogonal eigenvector matrix (the adjective orthogonal implies that $Q_t Q_t^T = 1$), and $\Lambda_t = \text{diag}[Ex_1^2(t), Ex_2^2(t), \ldots, Ex_n^2(t)]$ is a n×n diagonal matrix of the eigenvalues of $R_t$. Hence, by solving for the unique solution of $Q_t$ and $\Lambda_t$, the inventive method achieves eigen-decomposition. For a detailed discussion of this decomposition, see e.g. S. Haykin, *Adaptive Filter Theory*, Prentice-Hall, (1991, chapter 4). It should be noted that step 320 is only performed for $t \geq n$. Namely, $Q_t$ and $\Lambda_t$ do not exist when t<n.

However, it is computationally expensive to calculate $Q_t$ and $\Lambda_t$ for each new signal input $\underline{x}_t$. Hence, the method employs recursive estimation of the eigenvalues and eigenvectors as described below with reference to process 600 of FIG. 6.

Continuing with method 300 of FIG. 3, once $Q_t$ and $\Lambda_t$ have been eigen-decomposed from the vector $\underline{x}_t$, the next step applies principal component pruning (eigenpruning). Eigenpruning is based upon the concept disclosed by Levin et al. in *Fast Pruning Using Principal Components,* Advances in Neural Information Processing Systems (NIPS)6 pp. 35–42 (1994). This step consists of eliminating eigenmodes that are revealed in eigenspace to have minimal influence on the output of the system. In fact, the advantage of eigenspace decomposition is that it offers the ability to identify the independent contribution of each individual eigenmode on the error of the network. The process of eigenpruning is described below collectively in steps 330–370 in FIG. 3.

In step 330, $\tilde{x}_t$ is computed by:

$$\tilde{x}_t = Q_t^T \underline{x}_t \quad (10)$$

The term $\tilde{x}_t$ is referred to as the Karhunen-Loeve expansion of $\underline{x}_t$. The goal of this transformation is to bring $\underline{x}_t$ to its principal component space. This transformation is effectively a rotation of $\underline{x}_t$.

In step 340, $\tilde{y}_t$, the "unpruned" output of a layer of the neural network is computed by:

$$\tilde{y}_t = \tilde{W}_t^T \tilde{x}_t \quad (11)$$

Figure 4:
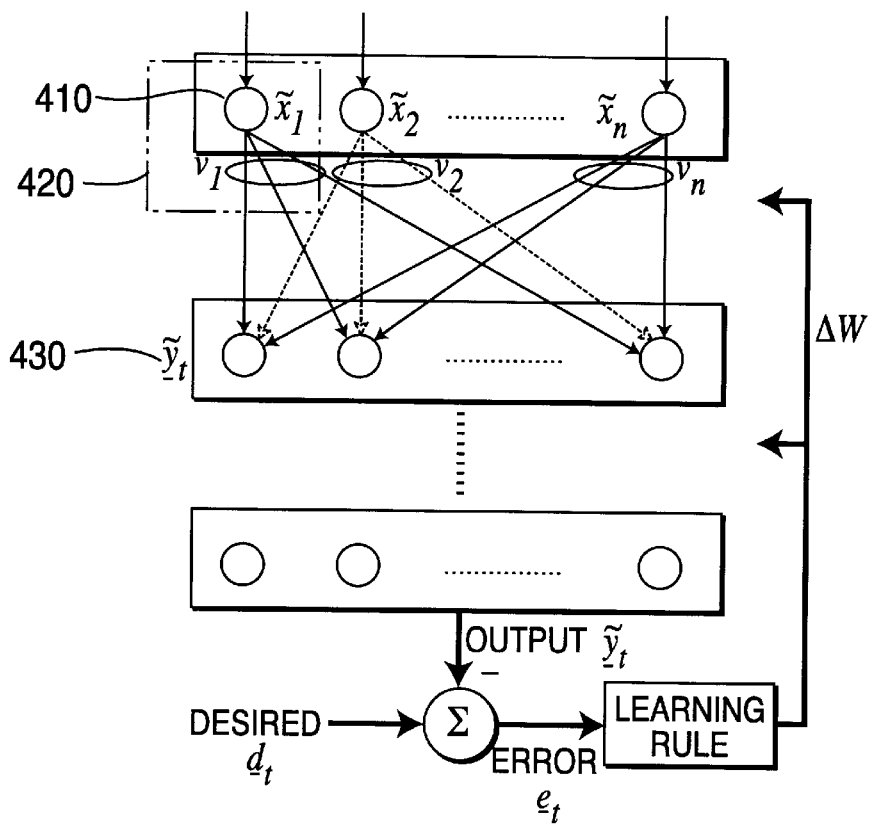
FIG. 4 is a block diagram of a neural network applying a spectral decomposition of $\hat{y}_t$.

If $\tilde{y}_t$ is a p×1 vector, then $\tilde{W}_t^T$ is a p×n weight matrix of a layer in the neural network. $\tilde{W}_t^T$ is defined as $\tilde{W}_t^T = [\underline{v}_1, \underline{v}_2, \ldots, \underline{v}_n]$, where each $\underline{v}_i$ is a p×1 vector. Hence, $\tilde{y}_t$ can also be expressed as $\tilde{y}_t = \Sigma_{i=1}^n \underline{v}_i \tilde{x}_i$. This is known as the spectral decomposition of $\tilde{y}_t$, and is illustrated in the neural network of FIG. 4. There are "n" vector terms (eigenmodes) in the spectral sum. Since $\tilde{x}_t$ 410 is in principal component space, it can be demonstrated that each eigenmode $\underline{v}_i \tilde{x}_i$ 420 contributes independently to the error in the output $\tilde{y}_t$ 430 in a layer of the neural network. Using an available desired output signal vector $\underline{d}_t$, the error is defined as $\underline{e}_t = \underline{d}_t - \tilde{y}_t$. If $\tilde{y}_t$ is from the output layer of a neural network, a desired output signal $\underline{d}_t$ is usually available. If $\tilde{y}_t$ holds activities for an intermediate (or hidden) layer in a neural network, a desired output signal $\underline{d}_t$ can be estimated by the back-propagation process. For a detailed exposition on computing desired signals for the hidden layers of a neural network by means of the back-propagation algorithm, see S. Haykin, *Neural Networks,* IEEE Press, (1994, chapter 6).

The next step in the eigenpruning process is performed in step 350 of FIG. 3. Eigenpruning is implemented by calculating the "saliency" of each eigenmode. Saliency is a quantity that measures the effect of the $i^{th}$ eigenmode on the output error. Eigenpruning consists of deleting the corresponding eigenmodes with the smallest saliencies such that the sum of the deleted saliencies is less than or equal to a predefined percent of the total sum of the saliencies. Removing eigenmodes with low saliencies reduces the effective number of parameters defining the network and improves generalization. In the embodiment of the present invention, one percent (1%) is chosen. Although this percentage works well with the training data that were used to train the neural network, other heuristics could be used as well.

There are three embodiments of the present invention with regard to the calculation of saliency for each eigenmode. In the first embodiment, since the contribution of $\underline{v}_i \tilde{x}_i$ to the error is independent from other eigenmodes, it follows that the maximum squared error introduced by each eigenmode $\underline{v}_i \tilde{x}_i$ is:

$$s_i(t) = [\underline{v}_i \tilde{x}_i]^T [\underline{v}_i \tilde{x}_i] = \underline{v}_i^T \underline{v}_i \tilde{x}_i^2 \quad (12)$$

The saliency $s_i(t)$ is an upper bound for the increase of the squared error when $\underline{v}_i \tilde{x}_i$ is subtracted from $\tilde{y}_t$.

In the second embodiment, saliency is alternatively expressed as:

$$\bar{s}_i(t) = \underline{v}_i^T \underline{v}_i \bar{\tilde{x}}_i^2, \quad (13)$$

where $\bar{\tilde{x}}_i^2$ is a low-pass filtered version of $\tilde{x}_i^2$, namely $\bar{\tilde{x}}_i^2(t) = \mu \bar{\tilde{x}}_i^2(t-1) + (1-\mu)\tilde{x}_i^2(t)$, where $\mu$ is the forgetting factor discussed above.

In the third embodiment of the present invention, saliency is defined as:

$$s_i = \lambda_i \hat{v}_i^T \hat{v}_i, \quad (14)$$

where $\lambda_i$ is the ith element on the diagonal of $\Lambda_t$.

To illustrate, since $Q_t$ is orthonormal, which implies $Q_t^T = Q_t^{-1}$, $\hat{y}_t$ can be expressed as:

$$\hat{y}_t = W_t Q_t Q_t^T \underline{x}_t = \hat{W}_t \tilde{x}_t = \Sigma_i \tilde{x}_i \hat{v}_i \quad (15)$$

where $\hat{W}_t = W_t Q_t$ and $\tilde{x}_t = Q_t^T \underline{x}_t$. Both $\tilde{x}_i$ and $\hat{v}_i$ (denote the ith column of $\hat{W}_t$ by $\hat{v}_i$) lie in the space spanned by the columns of $Q_t$. This third embodiment of saliency represents the modeling error $(y_t - \hat{y}_t)^2$ introduced by deleting the contribution of the term $\tilde{x}_i \hat{v}_i$. Lambda ($\lambda_i$) is the ith eigenvalue in the eigenvalue matrix $\Lambda_t$.

The third embodiment of the present invention is different from the other two embodiments in that, the third embodiment computes saliency by using the ith eigenvalue $\lambda_i$ from the eigenvalue matrix $\Lambda_t$, whereas the first two embodiments use the current input signal $\tilde{x}_i$. The difference is that $\lambda_i$ is a smoothed average of $\tilde{x}_i^2$.

With $s_i$ calculated in step 350 for each eigenmode using one of the three embodiments discussed above, the method then identifies a set of indices ($\Pi$) of eigenmodes with "small" saliencies. As discussed above, $\Pi$ may represent the set of indices for which the cumulative sum of the saliencies is less than or equal to a predefined percent of the total sum (over "n" eigenmodes) of the saliencies. When $\Pi$ has been identified, a p×1 pruning vector $\tilde{y}_t^P$ is computed as:

$$\tilde{y}_t^P = \Sigma_{i \in \Pi} \underline{v}_i \tilde{x}_i. \quad (16)$$

The pruning vector $\tilde{y}_t^P$ represents the set of eigenmodes that have minimal influence on the actual output signal of a layer of the neural network. As such, this pruning vector $\tilde{y}_t^P$ is used in step 360 to calculate the actual output.

In step 360, the method computes the output $\underline{y}_t$ of a layer as:

$$\underline{y}_t = \tilde{y}_t - \tilde{y}_t^P. \quad (17)$$

Since $\tilde{y}_t$ represents the "unpruned" output of a layer of the neural network, then it follows that $\underline{y}_t = \Sigma_{i \in \Pi} \underline{v}_i \tilde{x}_i$, where $\underline{y}_t$ is a pruned version of $\tilde{y}_t$ as computed in step 340. Step 360 effectively completes the eigenpruning process and generates the output signal for a layer of the neural network.

Finally, in step 370 the method updates the weights of the neural network by using standard adaptive filtering techniques such as the Transform Domain Adaptive Filtering (TDAF). If an error vector $\underline{e}_t = \underline{d}_t - \tilde{y}_t$ is available (or possibly has been estimated by the back-propagation process), then the weights of the corresponding layer of the neural network are updated by the following formula:

$$W_{t+1} = W_t \eta \Lambda_t^{-1} \tilde{x}_t \underline{e}_t^T, \text{ (TDAF)} \quad (18)$$

where $\eta$ is a learning rate parameter and $\tilde{x}_t = Q_t^T \underline{x}_t$.

It should be noted that other standard adaptive filtering techniques exist and that the use of the TDAF algorithm in the present invention is only illustrative. For a detailed discussion of the Transform Domain Adaptive Filtering (TDAF), see Marshall et al., *The Use of Orthogonal Transforms for Improving Performance of Adaptive Filters,* IEEE Transactions on Circuits and Systems, vol.36, no.4, (1989).

Figure 5:
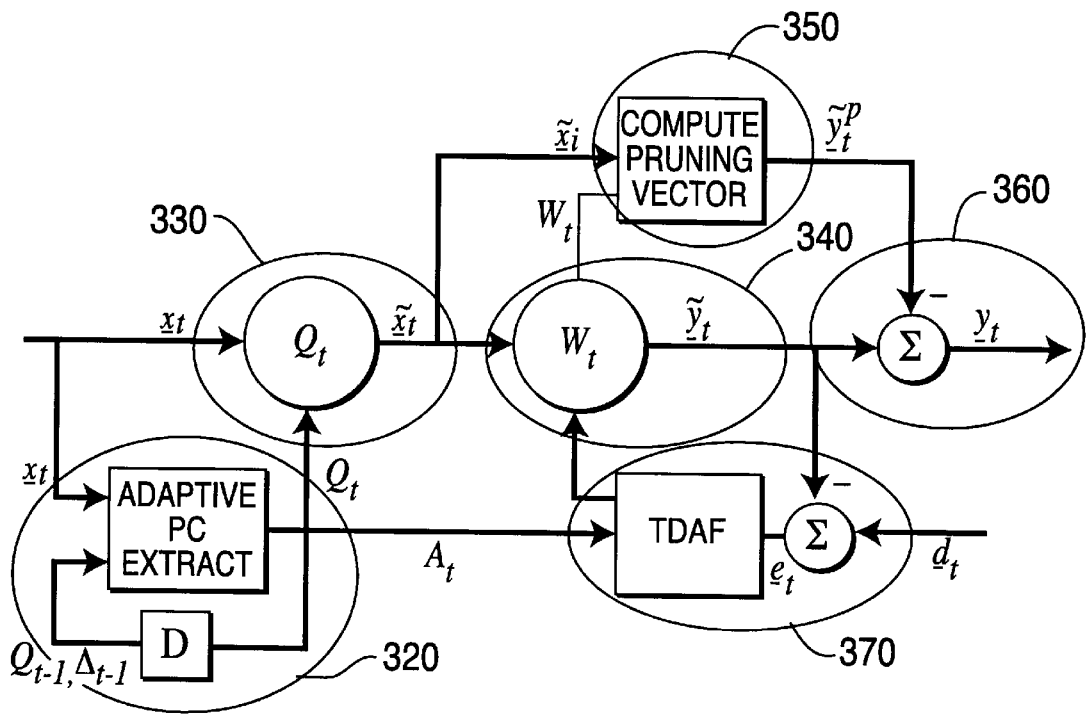
FIG. 5 is a block diagram of FIG. 3 showing the process of adaptive weight updating and adaptive eigenpruning.

After computing step 370, the method queries at step 380, whether additional input samples exist. If the query is answered affirmatively, the process reverts back to step 320 along path 390 and the process of adaptive eigenpruning and adaptive weight updating is repeated for the next input sample of the non-stationary signal. If the query is answered negatively, the process ends. An alternative perspective of the process 300 of FIG. 3 is provided in FIG. 5 in the form of a block diagram.

In FIG. 3, the weights and the effective number of nodes of the neural network are updated for every available input sample of a non-stationary signal. However, the direct computation of the matrices $Q_t$ and $\Lambda_t$ for every input vector $\underline{x}_t$ is inherently expensive, especially if n is a high number. Hence, it is necessary to employ techniques that can be used to recursively estimate the eigenvalues and eigenvectors.

There are two embodiments of the present invention for recursive estimation of the eigenvector matrix $Q_t$ and eigenvalue matrix $\Lambda_t$. These embodiments incorporate different extraction techniques and they are described with reference to FIG. 6. As discussed, the eigen-decomposition of step 320 of FIG. 3 becomes computationally expensive when eigen-decomposition is computed directly for each new input sample. Hence, step 320 includes steps to recursively estimate the eigenvector matrix $Q_t$ and eigenvalue matrix $\Lambda_t$ as new input samples are received.

Referring to FIG. 6, in step 610, a decision is made as to whether direct eigen-decomposition should be performed. This decision is based on whether eigen-decomposition has been performed for the previous input vector $\underline{x}_t$.

In step 615, if eigen-decomposition has not been performed, a decision is made as to whether $t \geq n$. As noted above, when $t < n$, $Q_t$ and $\Lambda_t$ do not exist and eigen-decomposition is not available at this point. Since eigen-decomposition is performed on a n×n matrix of $\underline{x}_t$, this causes the process to end at this point. If $t \geq n$, then the process proceeds to step 620, which is the identical step as described in step 320 for the direct eigen-decomposition of $\underline{x}_t$.

In the first embodiment of the present invention, if $Q_t$ and $\Lambda_t$ are available from the eigen-decomposition of the previous signal input $\underline{x}_{t-1}$, then recursive estimation of $Q_t$ and $\Lambda_t$ are computed with respect to the new input sample $\underline{x}_t$ by updating the covariance matrix $R_t$ in step 630. By using the covariance matrix $R_{t-1}$, the covariance matrix $R_t$ can be computed recursively as:

$$R_t = \mu R_{t-1} + (1-\mu)\underline{x}_t\underline{x}_t^T. \quad (19)$$

In step 640, an eigenspace decomposition on $R_t$ is then subsequently performed to obtain $Q_t$ and $\Lambda_t$.

The advantage of accurately tracking $Q_t$ and $\Lambda_t$ for the purpose of estimating the eigenvalues and eigenvectors recursively is significant. This step dramatically reduces the computational overhead of eigen-decomposing the new vector $\underline{x}_t$ directly as disclosed above in step 320. The saving is realized from having to only compute $\underline{x}_t\underline{x}_t^T$ which is only the product of a n×1 vector with a 1×n transpose vector. Using the covariance matrix of $R_{t-1}$ obtained from the previous eigen-decomposition of $\underline{x}_{t-1}$, $R_t$ can be computed inexpensively.

To illustrate, the recursive eigenpruning process requires the computation of the eigenvector matrix $Q_t$ and eigenvalue matrix $\Lambda_t$ for each new input sample. The straightforward method is to perform a standard eigen-decomposition of $R_t$. The number of elementary arithmetic manipulations (such as multiplications and additions) required for the eigen-decomposition of $R_t$ is on the order of $n^3$. This means that if the dimension of $R_t$ is n×n (say n=100), it will require $n^3$ (1,000,000 for n=100) arithmetic manipulations to compute the eigenvector matrix $Q_t$ and eigenvalue matrix $\Lambda_t$. Clearly, if these computations are performed for every input sample, a large computational resource will be required. However, with the use of extraction techniques, the saving in computational steps equates approximately to reducing $n^3$ computational steps to that of $n^2$ computational steps. As n increases, this saving in computational steps becomes extremely significant.

In a second embodiment of the present invention, algorithms such as APEX or LEAP are used to directly compute $Q_t$ and $\Lambda_t$ without updating the covariance matrix $R_t$. These algorithms are described in detailed in the articles by Kung S. Y., and Diamantaras., *A Neural Network Learning Algorithm for Adaptive Principal Component Extraction,* Proc. of IEEE Conf. on Acoustic, Speech and signal Processing (ICASSP), pp. 861–864, (1990) and Chen H. and Liu R., *An On-line Unsupervised Learning Machine for Adaptive Feature Extraction,* IEEE trans. on Circuits and Systems II, vol. 41, no.2, pp. 87–98, (1994). Namely, given the first m-1 principal components, the algorithm can produce the m-th component iteratively. The use of these extraction techniques will further reduce the total number of computational steps by removing step 630, where the covariance matrix $R_t$ is recursively updated.

These algorithms have been developed to reduce the computational load for the updating of $Q_t$ and $\Lambda_t$. The key to these "fast" eigen-decomposition algorithms is that $Q_t$ and $\Lambda_t$ are updated for each input sample directly from the data stream of $\underline{x}_t$ without computing $R_t$. Both APEX and LEAP are implemented in neural network hardware and/or software and their performance is comparable. Both methods consist of two mechanisms. The first mechanism computes the correlations between the various components of input signal $\underline{x}_t$. In APEX and LEAP, this mechanism is implemented by the "Hebbian" ("correlation") updating rule. The Hebbian algorithm finds the dominant correlations.

The second mechanism constrains the first mechanism such that the various correlations found by the Hebbian rule are orthogonal to each other. APEX uses an orthogonalizing learning rule that is referred to as anti-Hebbian learning, whereas LEAP implements the orthogonalizing process by the Gram-Schmidt rule. The mechanisms for correlation learning (Hebbian rule) and orthogonalization (anti-Hebbian and Gram-Schmidt rule) are standard and widely applied.

It should be noted that some of these algorithms were premised on the fact that the input signal is stationary. However, the advantage of applying these techniques to non-stationary signals coupled with the concept of adaptive eigenpruning is significant. As discussed above, the concept of eigenpruning provides an accurate method to update the weights and the effective number of nodes for a neural network, but it is computationally expensive when applied to a non-stationary signal for each input sample. Hence, the use of extraction techniques provides a powerful and efficient solution to reduce the number of computational steps necessary to implement the adaptive eigenpruning process for a non-stationary signal.

Thus, a novel neural network for processing non-stationary signals has been disclosed. However, many modifications and variations of the present invention will become apparent to those skilled in the art.

Specifically, the method of the present invention is implemented completely in eigenspace. However, it is possible to selectively modify various steps of process 300 in different space. To illustrate, eigenpruning can be accomplished by setting the values in a corresponding column in the eigenvector matrix $Q_t$ to zeros, which correlates to eigenmodes with small saliencies. After the eigenvector matrix Q(t) is eigenpruned, the weights of the network are updated. The eigenpruned weight matrix is computed as:

$$W_{ep}(t) = W(t) Q_{ep}(t) Q_{ep}^T(t), \quad (20)$$

where ep represents eigenpruned. Using the updated weight matrix $W_{ep}(t)$, a model output can be computed.

The model output is computed as:

$$\hat{y}_{ep}(t) = W_{ep}(t)\underline{x}(t). \quad (21)$$

Finally, the weights of the neural network are updated using standard adaptive filtering techniques such as the Least Mean Squares (LMS). This filtering technique is used in place of the TDAF and the weights of the corresponding layer of the neural network are updated by the following formula:

$$W_{t+1} = W_t + 2\eta \epsilon_k \underline{x}_t \text{ (LMS)} \quad (22)$$

where $\eta$ is a learning rate parameter and $\epsilon_k$ is the error signal. Hence, many modifications of the present invention are possible.

The neural network according to the present invention was tested to perform a number of simulations. In one simulation, the tick-by-tick values from May 1985 of the U.S. dollar versus Swiss Franc exchange rate were used as the non-stationary input signal. This time series contains successive tick values that were separated by a few minutes, but the sampling period was not a constant. The time series was processed to the extent that the maximal absolute value was rescaled to one and the mean value was rescaled to zero.

The goal is to predict the value of the exchange rate five ticks ahead, while making use of past values of the exchange rate. The neural network was trained using a training set of 1,000 samples and the next set of 1,000 samples was used as testing data. A two layer feedforward network with 40 'tanh' hidden nodes and one (1) linear output node was employed. In conjunction, a 10-dimensional vector x(t) =[y(t−5), y(t−6), . . . , y(t−14)]$^T$ was used as an input and y(t) as a target output. The goal of the network was to predict the exchange rate five (5) ticks ahead, while making use of the exchange rate of the last ten (10) ticks. The network was loaded with weights $w_o$, the weights from the trained unpruned network, and the weights were adapted on-line as the network moved over the test data, while the network employed adaptive weight updating and adaptive eigenpruning. A learning rate $\eta=0.05$ and forgetting factor $\lambda=0.98$ were chosen.

The results are very impressive. Instead of focusing on the predicted values of the exchange rate, the fraction of correctly estimated directions of the exchange rate was computed. In other words, the direction of the exchange rate was predicted. The direction of the exchange rate is computed as:

$$dir(t) = \begin{cases} -1 & \text{if } y(t) - y(t-1) < -\theta \\ 0 & \text{if } -\theta \leq y(t) - y(t-1) \leq \theta. \\ 1 & \text{else} \end{cases} \quad (23)$$

The area $[-\theta, \theta]$ is referred to as the deadzone. For $\theta=0$, i.e. no deadzone, the adaptive network correctly estimated 72% of the exchange rate directional movements. In fact, when a dead zone of $\theta=0.017$ is used, conditional on that a change took place (dir(t)≠0), the adaptive network predicted 80% of the exchange rate directional movements.

There has thus been shown and described a novel neural network for processing non-stationary signals such as financial data. Many changes, modifications, variations and other uses and applications of the subject invention will, however, become apparent to those skilled in the art after considering this specification and the accompanying drawings which disclose the embodiments thereof. All such changes, modifications, variations and other uses and applications which do not depart from the spirit and scope of the invention are deemed to be covered by the invention, which is to be limited only by the claims which follow.

What is claimed is:

1. A neural network having a plurality of weights for receiving a sequence of signal inputs $x_t, x_{t+1}, x_{t+2} \ldots$, each input $x_t$ comprising n signal components $x_1(t), x_2(t-1), \ldots, x_n(t-(n-1))$ and for generating an output signal that anticipates the behavior of said input signal for a number of time samples ahead, said neural network comprising:

transformation means for transforming a set of n signal inputs into a set of principal components having a saliency assigned to each of said principal component;

pruning means, coupled to said transformation means, for pruning a number of said principal components that correspond to the smallest saliencies, where the number of said principal components is limited by a sum of said saliencies of said pruned principal components to be less than or equal to a predefined threshold level, leaving a remaining set of principal components;

first computing means, coupled to said pruning means, for computing the output signal using said set of remaining principal components: and wherein said neural network an updating means, coupled to said first computing means, for updating the weights of the neural network adaptively based on an error between a target output and the output signal.

2. A neural network having a plurality of weights for receiving a sequence of signal inputs $x_t, x_{t+1}, x_{t+2} \ldots$, each input $x_t$ comprising n signal components $x_1(t), x_2(t-1), \ldots, x_n(t-(n-1))$ and for generating an output signal that anticipates the behavior of said input signal for a number of time samples ahead, said neural network comprising:

transformation means for transforming a set of n signal inputs into a set of principal components having a saliency assigned to each of said principal component:

pruning means coupled to said transformation means, for pruning a number of said principal components that correspond to the smallest saliencies, where the number of said principal components is limited by a sum of said saliencies of said pruned principal components to be less than or equal to a predefined threshold level, leaving a remaining set of principal components;

first computing means, coupled to said pruning means, for computing the output signal using said set of remaining principal components: and updating means, coupled to said first computing means, for updating the weights of the neural network adaptively based on an error between a target output and the output signal, wherein said transformation means includes an estimation means for recursively estimating a current set of principal components from a set of principal components of a previously transformed set of n signal inputs.

3. The neural network of claim 2, wherein said estimation means estimates said current set of principal components in accordance to the formula $$R_t = \mu R_{t-1} + (1-\mu)\underline{x}_t\underline{x}_t^T$$

where $R_{t-1}$ is a covariance matrix of a previous set of n signal inputs, $R_t$ is a covariance matrix of said current set of n signal inputs, $\mu$ is a predetermined constant, $\underline{x}_t$ is a current input signal, and $\underline{x}_t^T$ is a transpose of said current input signal.

4. The neural network of claim 2, wherein said estimation means estimates said current set of principal components by directly calculating a matrix $Q_t$ and a matrix $\Lambda_t$, where $Q_t$ is a matrix of eigenvectors and $\Lambda_t$ is a matrix of eigenvalues.

5. The neural network of claim 2, wherein said saliencies are calculated in accordance to the formula $$s_i(t) = [\underline{v}_i\tilde{x}_i]^T[\underline{v}_i\tilde{x}_i] = \underline{v}_i^T\underline{v}_i\tilde{x}_{i2}$$

where $\tilde{\underline{x}}_t$ is the Karhunen-Loeve expansion of $\underline{x}_t$ and $\underline{v}_i$ is a p×1 vector of $W_t^T$ defined as $W_t^T = [\underline{v}_1, \underline{v}_2, \ldots, \underline{v}_n]$.

6. The neural network of claim 2, wherein said saliencies are calculated in accordance to the formula $$\bar{s}_i(t) = \underline{v}_i^T\underline{v}_i\tilde{\bar{x}}_i^2$$

where $\tilde{\underline{x}}_t$ is the Karhunen-Loeve expansion of $\underline{x}_t$, $\underline{v}_i$ is a p×1 vector of $W_t^T$ defined as $W_t^T = [\underline{v}_1, \underline{v}_2, \ldots, \underline{v}_n]$, $\tilde{\bar{x}}_i^2$ is defined as $\tilde{\bar{x}}_i^2(t) = \mu\tilde{\bar{x}}_i^2(t-1) + (1-\mu)\tilde{x}_i^2(t)$ and $\mu$ is a forgetting factor.

7. The neural network of claim 2, wherein said saliencies are calculated in accordance to the formula $$s_i = \lambda_i\tilde{v}_i^T\underline{v}_i,$$

where $\lambda_i$ is the ith element on the diagonal of $\Lambda_t$ and $\underline{v}_i$ is a p×1 vector of $W_t^T$ defined as $W_t^T = [\underline{v}_1, \underline{v}_2, \ldots, \underline{v}_n]$.

8. The neural network of claim 2, wherein said pruning means includes:

second computing means for computing an output in principal component space;

identifying means, coupled to said second computing means, for identifying said principal components that correspond to the smallest saliencies, where a sum of said smallest saliencies is less than a predefined threshold level; and third computing means, coupled to said identifying means, for computing a pruning vector from said principal components that correspond to the smallest saliencies, where a sum of said smallest saliencies is less than a predefined threshold level.

9. The neural network of claim 2, wherein said pruning means includes:

identifying means for identifying said principal components that correspond to the smallest saliencies, where a sum of said smallest saliencies is less than a predefined threshold level; and fourth computing means, coupled to said identifying means, for computing a weight matrix in regular space from said principal components that correspond to the smallest saliencies, where a sum of said smallest saliencies is less than a predefined threshold level.

10. A method of signal processing, utilizing a neural network having a plurality of weights, for receiving a sequence of signal inputs $x_t$, $x_{t+1}$, $x_{t+2}$ . . . , each input $x_t$ comprising n signal components $x_1(t)$, $x_2(t-1)$, . . . , $x_n(t-(n-1))$ and for generating an output signal that anticipates the behavior of said input signal for a number of time samples ahead, said method comprising the steps of:

(a) transforming a set of n signal inputs into a set of principal components having a saliency assigned to each of said principal component;

(b) pruning a number of said principal components that correspond to the smallest saliencies, where the number of said pruned principal components is limited by a sum of said saliencies of said pruned principal components to be less than or equal to a predefined threshold level, leaving a remaining set of principal components:

(c) computing said output signal using said remaining set of principal components; and (d) updating the weights of the neural network adaptively based on an error between a target output and the output signal.

11. A method of signal processing, utilizing a neural network having a plurality of weights, for receiving a sequence of signal inputs $x_t, x_{t+1}, x_{t+2}$. . . each input $x_t$ comprising n signal components $x_1(t), x_2(t-1), \ldots, x_n(t-(n-1))$ and for generating an output signal that anticipates the behavior of said input signal for a number of time samples ahead, said method comprising the steps of:

(a) transforming a set of n signal inputs into a set of principal components having a saliency assigned to each of said principal component;

(b) pruning a number of said principal components that correspond to the smallest saliencies, where the number of said pruned principal components is limited by a sum of said saliencies of said pruned principal components to be less than or equal to a predefined threshold level, leaving a remaining set of principal components:

(c) computing said output signal using said remaining set of principal components: and (d) updating the weights of the network adaptively based on an error between a target output and the output signal wherein said transformation step includes an estimation step for recursively estimating a current set of principal components from a set of principal components of a previously transformed set of n signal inputs.

12. The method of claim 11, further comprising the step of:

(f) repeating steps (a)–(d) for each new signal input.

13. The method of claim 11, wherein said estimation step estimates said current set of principal components in accordance to the formula $$R_t = \mu R_{t-1} + (1-\mu)\underline{x}_t\underline{x}_t^T$$

where $R_{t-1}$ is a covariance matrix of a previous set of n signal inputs, $R_t$ is a covariance matrix of said current set of n signal inputs, $\mu$ is a predetermined constant, $\underline{x}_t$ is a current input signal, and $\underline{x}_t^T$ is a transpose of said current input signal.

14. The method of claim 11 wherein said estimating step estimates said current set of principal components by directly calculating a matrix $Q_t$ and a matrix $\Lambda_t$, where $Q_t$ is a matrix of eigenvectors and $\Lambda_t$ is a matrix of eigenvalues.

15. The method of claim 11, wherein said saliencies are calculated in accordance to the formula $$s_i(t) = [\underline{v}_i\tilde{x}_i]^T[\underline{v}_i\tilde{x}_i] = \underline{v}_i^T\underline{v}_i\tilde{x}_i^2$$

where $\tilde{\underline{x}}_t$ is the Karhunen-Loeve expansion of $\underline{x}_t$ and $\underline{v}_i$ is a p×1 vector of $W_t^T$ defined as $W_t^T = [\underline{v}_1, \underline{v}_2, \ldots, \underline{v}_n]$.

16. The method of claim 11, wherein said saliencies are calculated in accordance to the formula $$\bar{s}_i(t) = \underline{v}_i^T\underline{v}_i\tilde{\bar{x}}_i^2$$

where $\tilde{\underline{x}}_t$ is the Karhunen-Loeve expansion of $\underline{x}_t$, $\underline{v}_i$ is a p×1 vector of $W_t^T$ defined as $W_t^T = [\underline{v}_1, \underline{v}_2, \ldots, \underline{v}_n]$, $\bar{\tilde{x}}_i^2$ is defined as $\bar{\tilde{x}}_i^2(t) = \mu \bar{\tilde{x}}_i^2(t-1) + (1-\mu)\tilde{x}_i^2(t)$ and $\mu$ is a forgetting factor.

17. The method of claim 11, wherein said saliencies are calculated in accordance to the formula $$s_i = \lambda_i \tilde{v}_i^T \tilde{v}_i,$$

where $\lambda_i$ is the ith element on the diagonal of $\Lambda_t$ and $\underline{v}_i$ is a p×1 vector of $W_t^T$ defined as $W_t^T = [\underline{v}_1, \underline{v}_2, \ldots, \underline{v}_n]$.

18. The method of claim 11, wherein said pruning step includes the steps of:

computing an output in principal component space;

identifying said principal components that correspond to the smallest saliencies, where a sum of said smallest saliencies is less than a predefined threshold level; and computing a pruning vector from said principal components that correspond to the smallest saliencies, where a sum of said smallest saliencies is less than a predefined threshold level.

19. The method of claim 11, wherein said pruning step includes the steps of:

identifying said principal components that correspond to the smallest saliencies, where a sum of said smallest saliencies is less than a predefined threshold level; and computing a weight matrix in regular space from said principal components that correspond to the smallest saliencies, where a sum of said smallest saliencies is less than a predefined threshold level.

20. A signal processing system having a neural network for receiving a sequence of signal inputs $\underline{x}_t, \underline{x}_{t+1}, \underline{x}_{t+2} \ldots$, each input $\underline{x}_t$ comprising n signal components $x_1(t), x_2(t-1), \ldots, x_n(t-(n-1))$ and generating an output signal that anticipates the behavior of said input signal for a number of time samples ahead, said neural network having a plurality of hierarchically connected nodes forming a plurality of layers, each of said layer consisting of at least one node, said nodes being inter-connected with a plurality of weights, said signal processing system comprising:

transformation means for transforming a set of n signal inputs into a set of principal components having a saliency assigned to each of said principal component;

pruning means, coupled to said transformation means, for pruning a number of said principal components that correspond to the smallest saliencies, where the number of said pruned principal components is limited by a sum of said saliencies of said pruned principal components to be less than or equal to a predefined threshold level, leaving a remaining set of principal components;

computing means, coupled to said pruning means, for computing the output signal of a layer of the neural network using said set of remaining principal components; and updating means, coupled to said computing means, for updating the weights of the neural network adaptively based on an error between a target output and the output signal.

21. The signal processing system of claim 20, wherein said transformation means includes an estimation means for recursively estimating a current set of principal components from a set of principal components of a previously transformed set of n signal inputs.

* * * * *